United States Patent Office 2,855,406
Patented Oct. 7, 1958

2,855,406

PREPARATION OF BENZOPYRANS AND BENZOFURANS

Otto Dann, Erlangen, Germany

No Drawing. Application May 2, 1956
Serial No. 582,073

Claims priority, application Germany May 7, 1955

13 Claims. (Cl. 260—346.2)

This invention relates to a novel chemical synthesis, and to novel intermediates and processes useful in effecting that synthesis. More particularly, the invention relates to a process of making 4,9-di(lower alkoxy)-7-methyl-furo[3.2-g][1]benzopyran-5-one. The nomenclature of these compounds is based upon the numbering indicated under System No. 1706 in "The Ring Index" by Patterson and Capell (New York, 1940). Products of the class recited above are known to be useful as coronary vasodilators. In particular, 4,9-dimethoxy-7-methyl-furo [3.2-g][1]-benzopyran-5-one is the well known compound khellin, an active principle in the seeds of *Ammi visnaga*.

The starting materials for the process of the invention, viz. 3-oxo-4,7-di(lower alkoxy)-6-hydroxy-2,3-dihydrobenzofuran, can be prepared (for example) according to the teachings in Journal of the American Chemical Society 73, 1280 (1950). The nomenclature of these starting materials is based upon the preferred numbering indicated under System No. 841 in "The Ring Index," supra.

In a comprehensive embodiment, the invention provides a process which comprises reacting 3-oxo-4,7-di(lower alkoxy)-6-hydroxy-2,3-dihydrobenzofuran with hydroxylamine thereby producing 3-oximido-4,7-di(lower alkoxy)-6-hydroxy-2,3-dihydrobenzofuran, reducing the latter thereby producing 3-amino-4,7-di(lower alkoxy)-6-hydroxy-2,3-dihydrobenzofuran, splitting out ammonia from the latter thereby forming 4,7-di(lower alkoxy)-6-hydroxy-benzofuran, reacting the latter with β-halo-crotonic acid lower alkyl ester thereby producing 4,7-di(lower alkoxy)-6-(1-lower carbalkoxy-1-propen-2-yloxy) benzofuran, hydrolyzing the latter thereby producing 4,7-di(lower alkoxy)-6-(1-carboxy-1-propen-2-yloxy)-benzofuran, and cyclizing the latter thereby producing 4,9-di(lower alkoxy) - 7 - methyl - furo[3.2 - g][1]benzopyran-5-one.

In a preferred, specific embodiment, the invention provides a process which comprises reacting 3-oxo-4,7-dimethoxy-6-hydroxy-2,3-dihydrobenzofuran with hydroxylamine thereby producing 3-oximido-4,7-dimethoxy-6-hydroxy-2,3-dihydrobenzofuran, reducing the latter thereby producing 3-amino-4,7-dimethoxy-6-hydroxy-2,3-dihydrobenzofuran, splitting out ammonia from the latter thereby forming 4,7-dimethoxy-6-hydroxy-benzofuran, reacting the latter with β-halo-crontonic acid methyl ester thereby producing 4,7-dimethoxy-6-(1-carbomethoxy-1-propen-2-yloxy)-benzofuran, hydrolyzing the latter thereby producing 4,7 - dimethoxy - 6 - (1 - carboxy - 1 - propen-2-yloxy)-benzofuran, and cyclizing the latter thereby producing 4,9-dimethoxy-7-methyl-furo[3.2-g][1]benzopyran-5-one.

The first stage of the process of the invention is advantageously effected by mixing the starting material, 3-oxo-4,7-di(lower alkoxy)-6-hydroxy-2,3-dihydrobenzofuran, with a hydroxylamine salt, e. g. hydroxylamine hydrochloride, in an inert solvent, e. g. methanol, and adding to the reaction mixture an acid binding agent, e. g. sodium acetate. Preferably, moderate reaction temperatures in the range of from about 40° C. to about 50° C. are employed. An alternative mode of procedure comprises dissolving the starting material in dilute aqueous sodium hydroxide solution, mixing the resulting solution with one molar equivalent of soda and one molar equivalent of a hydroxylamine salt, and allowing the reaction mixture to stand at room temperature.

The oxime of the 3-oxo starting material, produced in the first stage of the reaction, i. e. 3-oximido-4,7-di(lower alkoxy)-6-hydroxy-2,3-dihydrobenzofuran, is then reduced to the corresponding amine. An appropriate mode of effecting this reduction is, for example, by reaction with sodium amalgam. Such reduction can best be effected by suspending the oxime in an inert reaction medium, for example, ethanol, and adding the sodium amalgam in small portions while simultaneously dropping in glacial acetic acid at such a rate that the reaction mixture is continuously maintained acidic. However, the reduction can also be effected by alternative methods of reduction known per se, e. g. by means of catalytically activated hydrogen. The amino compound resulting as the product of the reduction step, i. e. 3-amino-4,7-di(lower alkoxy)-6-hydroxy-2,3-dihydrobenzofuran, need not be isolated for further processing in the next stage.

The most advantageous method of effecting the next stage of the process of the invention, wherein ammonia is split out from the amino compound, comprises highly concentrating the solution of salts obtained in the preceding stage, in order to drive off the organic reaction medium, and then refluxing the residue with water. This operation effects removal of ammonia, with introduction of a new double bond between the 2- and 3-carbon atoms. The 4,7-di(lower alkoxy)-6-hydroxy-benzofuran obtained as the product of the deamination step can be purified by repeated distillation in vacuo.

In the next stage of the process according to the invention, said 4,7-di(lower alkoxy)-6-hydroxy-benzofuran is reacted with a lower alkyl ester of β-halo-crotonic acid, e. g. a methyl or ethyl ester of β-chloro- or bromo-crotonic acid. The reaction is advantageously effected in acetone, in the presence of potassium carbonate, and at moderate reaction temperatures, e. g. in the range of from about 50° C. to about 60° C.

The product obtained in the preceding stage, i. e. 4,7-di(lower alkoxy)-6-(1-lower carbalkoxy-1-propen-2-yloxy)-benzofuran, is then saponified, according to methods known per se, preferably by permitting the ester to stand at room temperature, in an aqueous or an aqueous-alcoholic solution of an alkali metal hydroxide, for several hours, or for a longer period ranging up to several days. The free acid, 4,7-di(lower alkoxy)-6-(1-carboxy-1-propen-2-yloxy)-benzofuran, is then obtained from the saponification mixture by acidification with a mineral acid.

In the final stage of the process according to the invention, the above identified free acid is cyclized. A suitable mode of procedure, for example, comprises pouring acetyl chloride over the free acid and then adding a trace of concentrated sulfuric acid or perchloric acid, thereby effecting solution of the reactants. The cyclic reaction product separates from the reaction mixture after the latter stands for some time. A preferred method of effecting the cyclization reaction comprises permitting the reaction mixture to stand at room temperature for a period of from about two to about ten days. The product is formed slowly, and as the amount thereof gradually increases the material eventually crystallizes from the reaction mixture. Presumably the precipitated material is an oxonium salt. The precipitated material can be converted to the free 4,9-di(lower alkoxy)-7-methyl-furo[3.2-g][1]benzopyran-5-one by reacting the precipitate with water or with sodium bicarbonate solution.

The invention is further disclosed in the following examples, which are illustrative but not limitative thereof.

*Example 1*

To 750 ml. of pure methanol 42 g. of 3-oxo-4,7-dimethoxy-6-hydroxy-2,3-dihydrobenzofuran was added and dissolved to the maximum extent possible; and to the mixture was added, while stirring, a solution of 36 g. of hydroxylamine hydrochloride in a little water and then 48 g. of finely powdered anhydrous sodium acetate was added. The reaction mixture was stirred for 10 hours at 40° to 50° C., and then for a further period of 10 hours at room temperature. The insoluble oxime was filtered off with suction and the filter cake was triturated with water in order to dissolve the inorganic material contained therein. The methanolic filtrate was concentrated in vacuo, and the concentrated methanolic solution was mixed with water, thereby precipitating a further quantity of the oxime. In this manner there was obtained 37 g. of 3-oximido-4,7-dimethoxy-6-hydroxy-2,3-dihydrobenzofuran, which was recrystallized from ethanol (alternatively, from aqueous methanol). Decomposition point, 198° C. (with previous carbonization).

*Example 2*

A suspension was prepared of 30 g. of 3-oximido-4,7-dimethoxy-6-hydroxy-2,3-dihydrobenzofuran in a mixture of 600 ml. of absolute ethanol and 80 cc. of glacial acetic acid. The suspension was heated to 40° to 50° C. and then, over a four hour period, 1.5 kg. of sodium amalgam, containing 2.5% by weight Na, was added in small portions and while stirring. Simultaneously, glacial acetic acid was added dropwise in order to maintain the reaction mixture constantly acidic. The reaction mixture was then stirred 12 hours longer at room temperature. At the end of this time, the mercury was separated and the precipitated salts were dissolved by addition of water. The mercury was purified, first by shaking with water and then with acetone. The combined solutions, which contained 3-amino-4,7-dimethoxy-6-hydroxy-2,3-dihydrobenzofuran in salt form, were concentrated in vacuo almost to dryness, then 500 ml. of water was added and the mixture was refluxed for two hours. The solution was cooled, and extracted with diethyl ether. The ethereal layer was separated and dried over sodium sulfate. The solvent was driven off and the residual oil was distilled twice in vacuo, thereby yielding 14 g. of 4,7-dimethoxy-6-hydroxy-benzofuran in the form of an orange colored oil having B. P. 145° C./1.2 mm.; $n_D^{22}$=1.5721.

*Example 3*

A solution was prepared by dissolving 1.94 g. of 4,7-dimethoxy-6-hydroxy-benzofuran in 50 ml. of anhydrous acetone and the solution was mixed, while stirring, with 10 g. of anhydrous, finely powdered potassium carbonate. 1.34 g. of β-chloro-crotonic acid methyl ester was added dropwise and the reaction mixture was heated at 50° to 60° C. for 12 hours, while stirring. The solution was filtered from the inorganic salts while still hot. The filter cake was washed with warm acetone, the washings being added to the filtrate, and the combined liquors were concentrated. The residual crude 4,7-dimethoxy-6-(1-carbomethoxy-1-propen-2-yloxy)-benzofuran was dissolved in 13 ml. of ethanol. In order to saponify the ester, 6.5 ml. of aqueous sodium hydroxide solution containing 50% by weight NaOH was added, and the mixture was allowed to stand for five days at room temperature, with occasional shaking. The clear, orange colored solution so obtained was acidified with concentrated hydrochloric acid while cooling with ice. The precipitate was recrystallized from methanol with addition of a little activated carbon. There was thus obtained 4,7-dimethoxy-6-(1-carboxy-1-propen-2-yloxy)-benzofuran in the form of silver-white needles having a decomposition point of 189° C. (with decarboxylation).

*Example 4*

First, 25 ml. of acetyl chloride was poured over 2.78 g. of 4,7-dimethoxy-6-(1-carboxy-1-propen-2-yloxy)-benzofuran and then 5 drops of concentrated sulfuric acid was added, whereupon all of the starting material went into solution, resulting in a red-brown coloration. Upon standing for 24 hours, the first crystalline precipitate was observed. The mixture was permitted to stand for 10 days at room temperature, then the precipitated product was filtered off with suction and was suspended in aqueous sodium bicarbonate solution. The filtrate was concentrated in vacuo and was slowly mixed, while cooling with ice, with a saturated aqueous sodium bicarbonate solution. From the thus neutralized solution, fine needles of M. P. 150°–151° crystallized in about 12 hours. The combined crystalline precipitates were recrystallized from aqueous ethanol and decolorized with activated carbon. The yield of khellin (4,9-dimethoxy-7-methyl-furo[3.2-g][1]benzopyran-5-one), having a melting point of 154° C., amounted to at least 800 mg. The mixed melting point with natural khellin showed no depression.

I claim:

1. A process which comprises reacting 3-oxo-4,7-di-R-6-hydroxy-2,3-dihydrobenzofuran with hydroxylamine thereby producing 3-oximido-4-7-di-R-6-hydroxy-2,3-dihydrobenzofuran, reducing the latter thereby producing 3-amino-4,7-di-R-6-hydroxy-2,3-dihydrobenzofuran, splitting out ammonia from the latter thereby producing 4,7-di-R-6-hydroxy-benzofuran, reacting the latter with β-halo-crotonic acid lower alkyl ester thereby producing 4,7-di-R-6-(1-lower carbalkoxy-1-propen-2-yloxy)benzofuran, hydrolyzing the latter thereby producing 4,7-di-R-6-(1-carboxy-1-propen-2-yloxy) - benzofuran, and cyclizing the latter thereby producing 4,9-di-R-7-methyl-furo[3.2-g][1]benzopyran-5-one; R representing a lower alkoxy radical.

2. A process which comprises cyclizing 4,7-di-R-6(1-carboxy-1-propen-2-yloxy)-benzofuran by treatment with acetyl chloride thereby producing 4,9-di-R-7-methyl-furo[3.2-g][1]benzopyran-5-one; R representing a lower alkoxy radical.

3. 4,7-di-R-6-(1-carboxy-1-propen-2-yloxy)-benzofuran; R representing a lower alkoxy radical.

4. 4,7-dimethoxy-6-(1-carboxy - 1 - propen - 2 - yloxy)-benzofuran.

5. A process of making 4,7-di-R-6-(1-carboxy-1-propen-2-yloxy)-benzofuran which comprises reacting 4,7-di-R-6-hydroxy-benzofuran with a lower alkyl ester of β-halo-crotonic acid and hydrolyzing; R representing a lower alkoxy radical.

6. 4,7-di-R-6-hydroxy-benzofuran; R representing a lower alkoxy radical.

7. A process of making 4,7-di-R-6-hydroxy-benzofuran which comprises deaminating 3-amino-4,7-di-R-6-hydroxy- 2,3-dihydrobenzofuran; R representing a lower alkoxy radical.

8. 3-amino-4,7-di-R-6-hydroxy-2,3-dihydrobenzofuran; R representing a lower alkoxy radical.

9. 3-amino-4,7-dimethoxy-6-hydroxy-2,3-dihydrobenzofuran.

10. A process of making 3-amino-4,7-di-R-6-hydroxy-2,3-dihydrobenzofuran which comprises reducing 3-oximido-4,7-di-R-6-hydroxy-2,3-dihydrobenzofuran; R representing a lower alkoxy radical.

11. 3-oximido-4,7-di-R-6-hydroxy-2,3-dihydrobenzofufan; R representing a lower alkoxy radical.

12. 3-oximido-4,7-dimethoxy-6-hydroxy-2,3-dihydrobenzofuran.

13. A process of making 3-oximido-4,7-di-R-6-hydroxy-2,3-dihydrobenzofuran which comprises reacting 3-oxo-4,7-di-R-6-hydroxy-2,3-dihydrobenzofuran with a hydroxylamine-yielding compound; R representing a lower alkoxy radical.

References Cited in the file of this patent

FOREIGN PATENTS 663,369     Great Britain _____ Dec. 19, 1951

OTHER REFERENCES

Chemical Reviews, vol. 48, page 558 (1951); Elderfield, R. C., Heterocyclic Cmpds., vol. 2 (1951), pages 42, 67, 248.

UNITED STATES PATENT OFFICE
Certificate of Correction

Patent No. 2,855,406                                                                                                         October 7, 1958

Otto Dann

It is hereby certified that error appears in the above numbered patent requiring correction and that the said Letters Patent should read as corrected below.

In the heading to the printed specification, line 7, for "Claims priority, application Germany May 7, 1955" read —Claims priority, application Germany May 17, 1955—.

Signed and sealed this 28th day of April 1959.

[SEAL]

Attest:
T. B. MORROW,
*Attesting Officer.*                                           ROBERT C. WATSON,
                                                                                       *Commissioner of Patents.*